(12) United States Patent
Beaty et al.

(10) Patent No.: US 10,491,931 B2
(45) Date of Patent: Nov. 26, 2019

(54) TRACKING AND VISUALIZING VIDEO UTILIZATION

(71) Applicant: RedCritter Corp., Flower Mound, TX (US)

(72) Inventors: Robert M. Beaty, Flower Mound, TX (US); Randy M. Whelan, Coppell, TX (US); James L. Rockett, Jr., Carrollton, TX (US)

(73) Assignee: RedCritter Corp., Flower Mound, TX (US)

( * ) Notice: Subject to any disclaimer, the term of this patent is extended or adjusted under 35 U.S.C. 154(b) by 0 days.

(21) Appl. No.: 15/905,569

(22) Filed: Feb. 26, 2018

(65) Prior Publication Data

US 2019/0268631 A1    Aug. 29, 2019

(51) Int. Cl.
*H04N 21/2387* (2011.01)
*H04N 21/845* (2011.01)
*H04N 21/472* (2011.01)

(52) U.S. Cl.
CPC ... *H04N 21/2387* (2013.01); *H04N 21/47217* (2013.01); *H04N 21/8456* (2013.01)

(58) Field of Classification Search
CPC ......... H04N 21/2387; H04N 21/47217; H04N 21/8456
See application file for complete search history.

(56) References Cited

U.S. PATENT DOCUMENTS

| | | | |
|---|---|---|---|
| 2002/0078441 A1* | 6/2002 | Drake | H04N 7/16 |
| 2008/0060026 A1* | 3/2008 | Cheung | H04N 7/18 |
| 2012/0237183 A1* | 9/2012 | Chen | H04N 9/80 |

* cited by examiner

*Primary Examiner* — Benjamin R Bruckart
*Assistant Examiner* — Anthony Bantamoi
(74) *Attorney, Agent, or Firm* — Kirton McConkie; Brian Tucker

(57) ABSTRACT

A client process and a server process interact to allow the utilization of a video to be visualized during playback. When a video is played on a user device, the client process can detect state changes in the video player and report these state changes to the server process to allow the server process to maintain records of the video segments that were played. The server process can then use these records to calculate video utilization metrics for a particular video and report these metrics to the client process when the particular video is played on the user device. The client process in turn can generate a user interface element to represent the metrics and display the user interface element while the video is played.

18 Claims, 14 Drawing Sheets

| UserID | VideoID | GroupID | Video SessionID | Start TimeCode | End TimeCode | Video Duration |
|---|---|---|---|---|---|---|
| UserID1 | VideoID1 | GroupID1 | UserID1_20180215130000 | 0 | 180 | 300 |
| UserID1 | VideoID1 | GroupID1 | UserID1_20180215130100 | 180 | 300 | 300 |
| UserID1 | VideoID1 | GroupID1 | UserID1_20180215142000 | 0 | 30 | 300 |
| UserID1 | VideoID1 | GroupID1 | UserID1_20180216081500 | 0 | 60 | 300 |
| UserID1 | VideoID1 | GroupID1 | UserID1_20180216083000 | 0 | 30 | 300 |
| UserID1 | VideoID1 | GroupID1 | UserID1_20180216090000 | 30 | 300 | 300 |
| UserID1 | VideoID1 | GroupID1 | UserID1_20180217153000 | 0 | 300 | 300 |
| ... | | | | | | |

*FIG. 3F*

TRACKING AND VISUALIZING VIDEO UTILIZATION

CROSS-REFERENCE TO RELATED APPLICATIONS

N/A

BACKGROUND

HTML5 is the current standard for structuring and presenting content within a browser. HTML5 introduced features for handling multimedia natively including the <video> element for embedding video within any web page and the associated Document Object Model (DOM) for enabling access to the <video> element using JavaScript. Using the <video> element, a video can be embedded into any web page and played within any browser that supports HTML5.

A number of player APIs have been developed to facilitate using a third party video player. For example, Google provides the IFrame Player API that developers can employ to embed YouTube videos into their web pages, and Vimeo provides the Player API for embedding Vimeo videos. In each case, these player APIs are built upon the HTML5 DOM. It is also possible to develop a custom player that interfaces directly with the HTML5 DOM as opposed to employing a third party API. The present invention can be implemented to employ any of these third party APIs or to interface directly with the HTML5 DOM.

BRIEF SUMMARY

The present invention extends to methods, systems, and computer program products for tracking and visualizing video utilization. The present invention includes a client process and a server process that interact to allow the utilization of a video to be visualized during playback. When a video is played on a user device, the client process can detect state changes in the video player and report these state changes to the server process to allow the server process to maintain records of the video segments that were played. The server process can then use these records to calculate video utilization metrics for a particular video and report these metrics to the client process when the particular video is played on the user device. The client process in turn can generate a user interface element to represent the metrics and display the user interface element while the video is played.

In one embodiment, the present invention is implemented by a client process and a server process as a method for tracking and visualizing video utilization. The client process detects a start of playback of a video on a user device and generates a session identifier for the start of playback. The client process also obtains a start time code defining a time within the video when the start of playback occurred and sends a first request to the server process. The first request includes a user identifier of a user of the user device, a video identifier of the video, the session identifier, and the start time code. The server process creates a record in a data structure that includes the user identifier, the video identifier, the session identifier, and the start time code. The client process detects an end of playback of the video, obtains an end time code defining a time within the video when the end of playback occurred, and sends a second request to the server process. The second request includes the session identifier and the end time code. The server process accesses the record using the session identifier included in the second request and updates the record to include the end time code.

In some embodiments, the server process may also receive a user participation request from the client process. The user participation request includes the user identifier and the video identifier. The server process can then retrieve each record in the data structure that includes the user identifier and the video identifier and create an array of elements corresponding to a number of segments of the video. For each retrieved record, the server process can calculate each segment of the video that is encompassed by the start time code and the end time code included in the record and, for each encompassed segment, increment a value of the corresponding element in the array such that the value of each element in the array represents a number of times that the user viewed the corresponding segment of the video. The server process can then send the array to the client process. In other embodiments, the server process can receive a group participation request from the client process. In such cases, the server process can set the value of each element in the array to represent the number of users in the group that have viewed the corresponding segment.

In some embodiments, the client process may also generate a user interface element that is segmented based on the number of segments. The client process can also calculate, based on the value of a corresponding element in the array, an appearance value for each segment of the user interface element. The client process may then display the user interface element in conjunction with a progress bar of a video player in which the video is loaded with each segment of the user interface element being displayed in accordance with the corresponding appearance value.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 3A-3F depict a process by which the utilization of a video is tracked;

DETAILED DESCRIPTION

Figure 1:
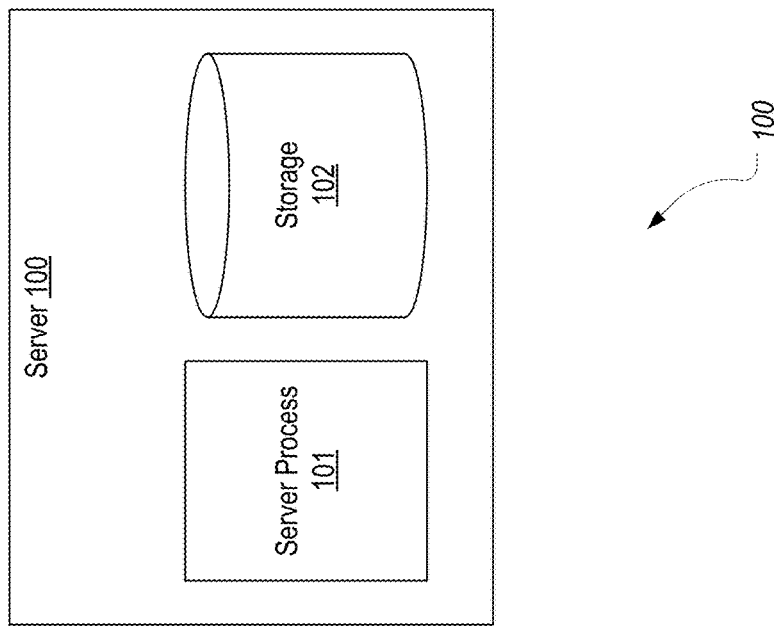
FIG. 1 illustrates an example client/server computing environment in which the present invention can be implemented.
Figure 1:
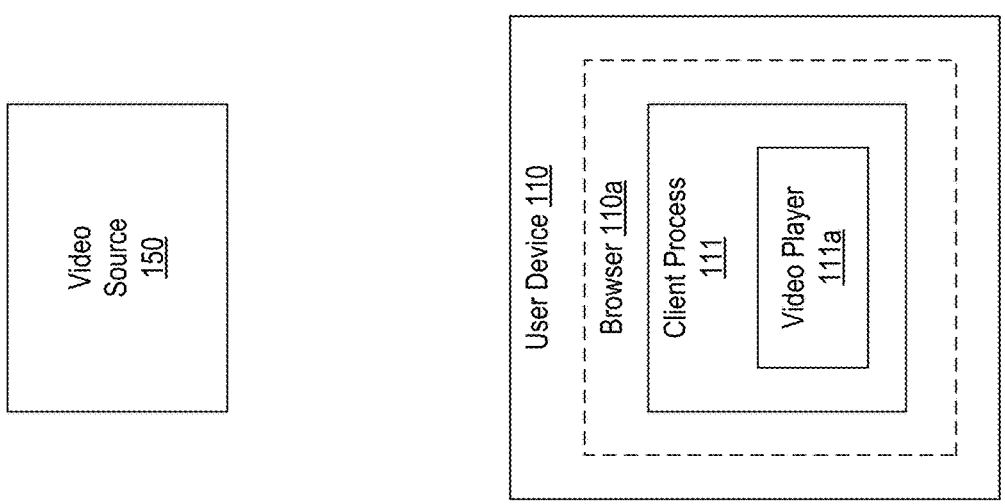

FIG. 1 depicts an example computing environment 100 in which the present invention can be implemented. Environment 100 includes a server 100, a user device 110 and a video source 150. Video source 150 may typically represent a third party video provider such as YouTube or Vimeo. However, video source 150 may be any source of video that can be provided to user device 110. In some embodiments, video source 150 could be part of server 100 or even part of user device 110 (e.g., a localhost server). In short, the origin of the videos is not important.

User device 110 can represent any computing device (e.g., desktops, laptops, tablets, smartphones, smart TVs, etc.) that is capable of rendering video content. User device 110 may typically include a browser 110a in which HTML5 video content is rendered. However, it is possible that user applications other than browsers could be configured to render the HTML5 video content, and therefore, browser 110a is shown in dashed lines to represent that it is optional. Although this specification will refer to HTML5, the present invention would extend to any subsequent versions of the HTML standard or other similar standards/techniques that may be employed to deliver video content to a user device.

A client process 111 can be executed on user device 110 for the purpose of implementing the techniques of the present invention. In browser-based implementations, client process 111 may typically be a JavaScript program. Client process 111 implements a video player 111a. As an example, client process 111 could employ the HTML5<video> element to implement video player 111a as is known in the art.

Figure 2:
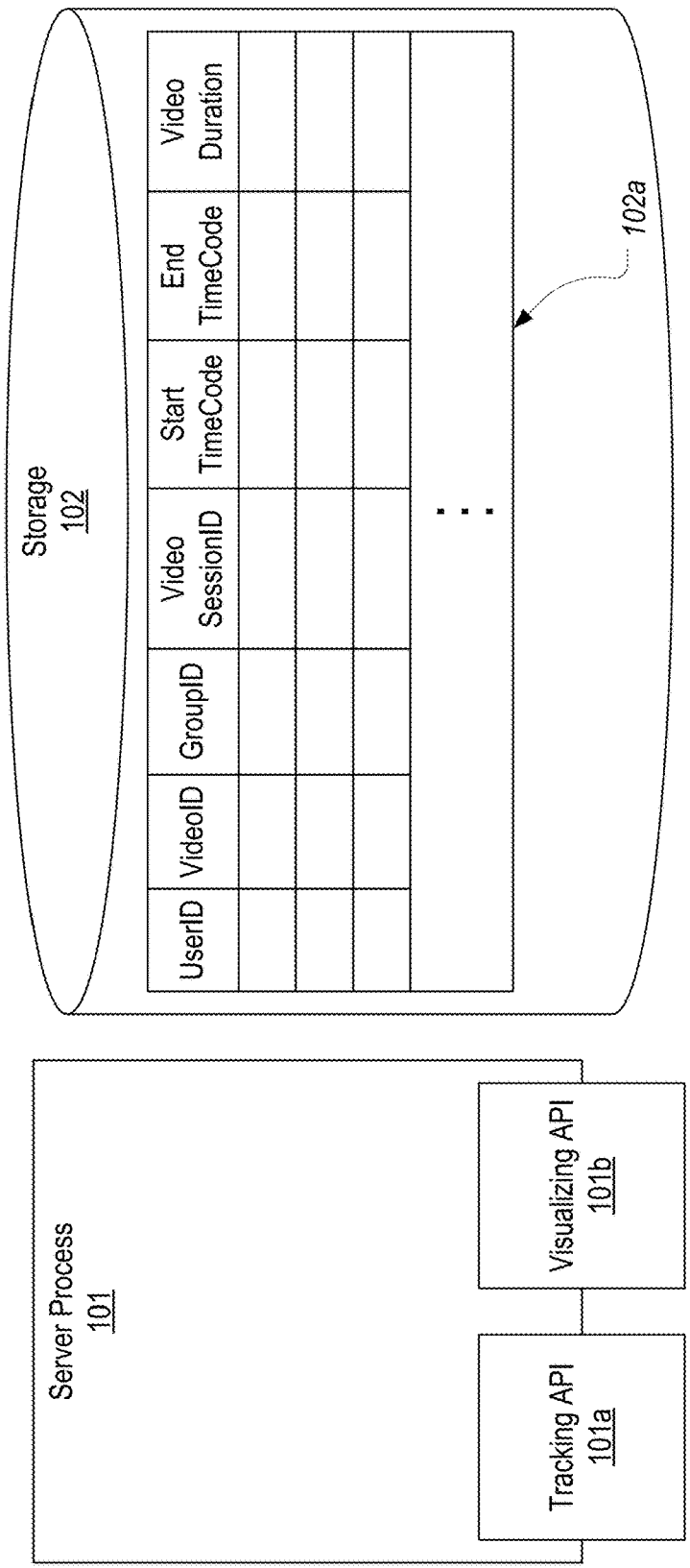
FIG. 2 illustrates an example architecture of the server in the example computing environment.

Server 100 can represent any computing device or group of computing resources (e.g., a cloud) that is configured to function as a server. Server 100 executes a server process 101 and implements or interfaces with a storage 102. FIG. 2 provides a more detailed view of the architecture of server 100. As shown, server process 101 can include a tracking API 101a and a visualization API 101b by which client process 101 can communicate with server process 101 for the purpose of tracking and visualizing video utilization respectively. By way of example only, tracking API 101a and visualizing API 101b may be implemented as RESTful APIs. Storage 102 is employed to maintain a data structure 102a in which video utilization records (or simply "records") are stored. As will be described in more detail below, data structure 102a (which may be a database, a table, or any other suitable structure) is configured to store records which consist of the following fields: a UserID, a VideoID, an optional GroupID, a VideoSessionID, a StartTimeCode, an EndTimeCode, and a VideoDuration. The UserID field stores a unique identifier of a particular user, the VideoID field stores a unique identifier of a particular video, the GroupID field can store a unique identifier of a particular group, the VideoSessionID field stores a unique identifier for the particular record, the StartTimeCode field stores a timestamp or other identifier of the beginning of a portion of the corresponding video, the EndTimeCode field stores a timestamp or other identifier of the end of the portion, and the VideoDuration field stores a value defining the duration (or length) of the corresponding video. As mentioned, in some embodiments, data structure 102a may not include the GroupID field. However, by including the GroupID field in data structure 102a, group video utilization can be visualized as will be described below.

FIGS. 3A-3F illustrate a process for tracking video utilization. It is assumed that this process is performed within example computing environment 100. However, various elements have been omitted from the figures to simplify the illustration. It is important to note that this same process can be performed by an instance of client process 111 that is executed on many different user devices. In other words, the video utilization of many different users can be tracked in accordance with embodiments of the present invention.

Figure 3A:
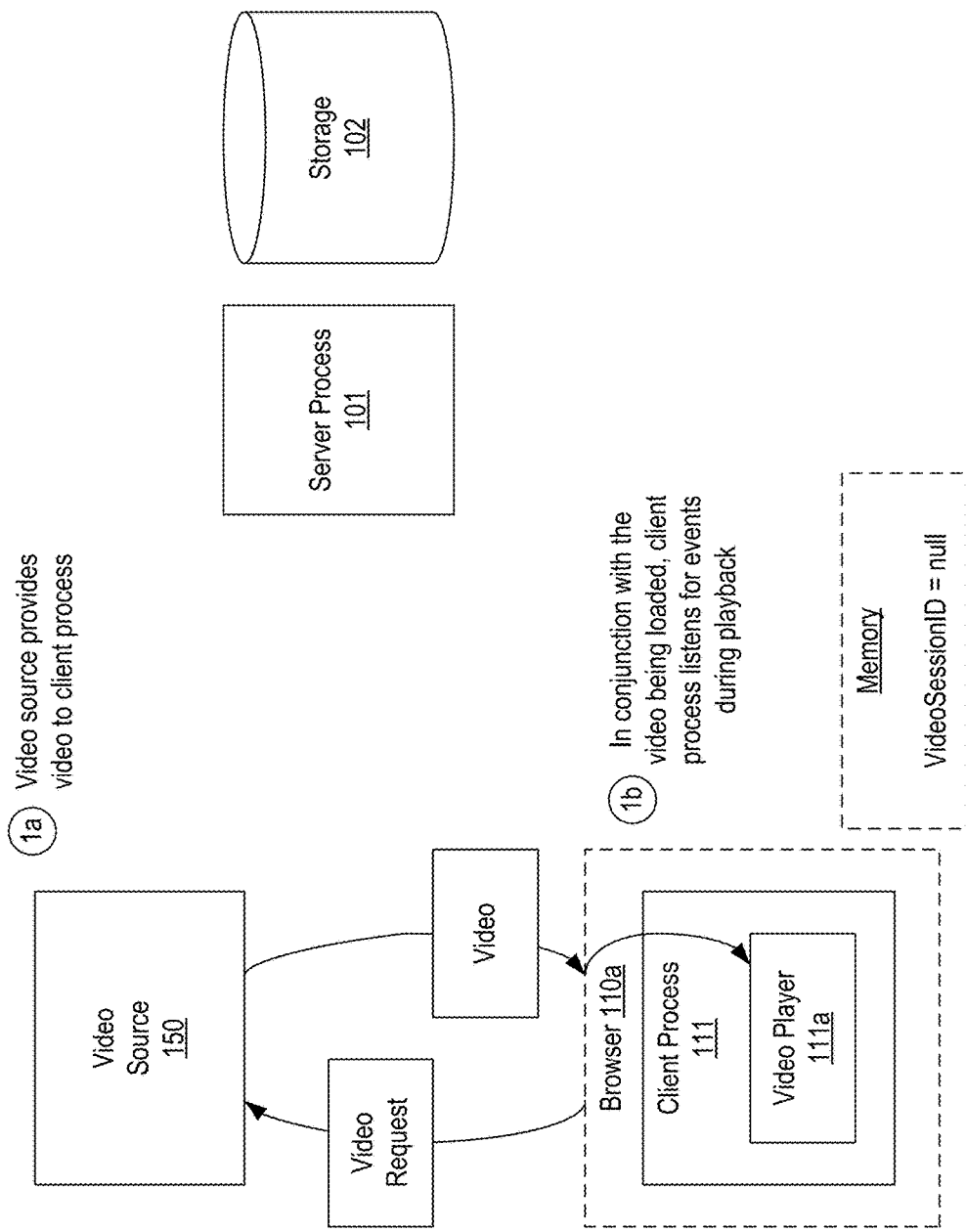

FIG. 3A depicts the initial steps of requesting and loading a video for playback on user device 110. Typically, a user of user device 110 may visit a webpage that includes embedded video and that is configured with client process 111. As mentioned above, the <video> element can be employed to embed video in the content of a webpage. As is known in the art, and as is represented in step 1a, as part of processing the <video> element, browser 110a will send a request to video source 150 for a particular video (e.g., based on a defined URL). As a result, the video will be loaded for playback in video player 111a. In conjunction with the loading of the video, and as represented by step 1b, client process 111 can register to receive notifications when the state of video player 111a changes (e.g., by calling the addEventListener method to attach an event handler to the <video> element for each event to be handled). These state changes or events can include Play, Pause, Resume, Stop or their equivalents. As part of step 1b, client process 111 can also initialize a variable for storing a VideoSessionID and set it to a particular value (e.g., null). At this point, it will be assumed that the video is loaded but has not yet started to play. For purposes of this example, it will be assumed that the user of user device 110 has a UserID of UserID1, the user is part of a group with a GroupID of GroupID1, and the video retrieved in step 1b has a VideoID of VideoID1.

Figure 3B:
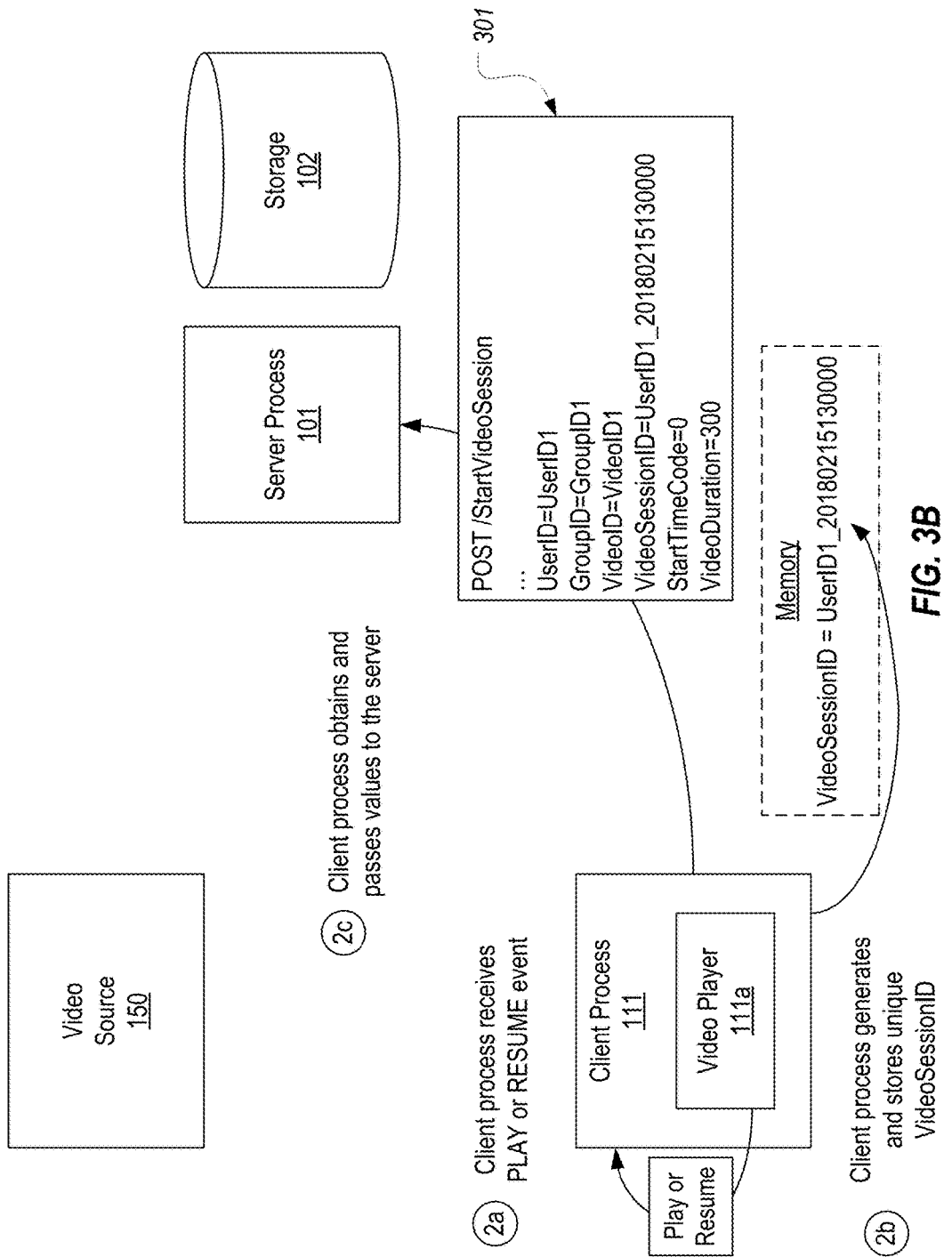

Turning now to FIG. 3B, it is assumed that playback of the video is started thereby causing a Play event to be raised. In step 2a, client process 111 will receive this Play event. In response, client process 111 can generate a unique identifier for this "session" of playback and can store this unique identifier in the VideoSessionID variable as represented in step 2b. Although not shown, as part of step 2b, client process can first verify whether the value of VideoSessionID is null (or set to some other predefined value) for reasons that will be explained below with reference to step 4c. In some embodiments, client process 111 can generate a unique identifier for a session by appending a timestamp to the UserID of the current user (e.g., UserID1_20180215130000) and storing the unique identifier in the VideoSessionID variable.

In addition to storing the VideoSessionID for this session, and in step 2c, client process 111 sends a StartVideoSession request 301 to server process 101 (e.g., via an HTTP Post request to a StartVideoSession endpoint of tracking API 101a). Request 301 can include the UserID of the current user (UserID1), the VideoID of the video being played (VideoID1), the VideoSessionID that client process 111 generated for this session (UserID1_20180215130000), a StartTimeCode representing the location within the video where playback has started (which is assumed to be 0 in this instance), and the VideoDuration of the video (which is assumed to be 300 seconds in this instance). In some embodiments, request 301 may also include a GroupID of the current user which defines a group to which the user pertains.

In the HTML5 context, client process 111 can obtain the StartTimeCode and VideoDuration values using the currentTime and duration properties of the <video> element. The value of the VideoID can be any identifier that uniquely identifies the video and may be based on the source URL for the video. Client process 111 can retrieve the UserId and GroupID in any suitable manner (e.g., by accessing information from the user's account that he/she has signed into).

Figure 3C:
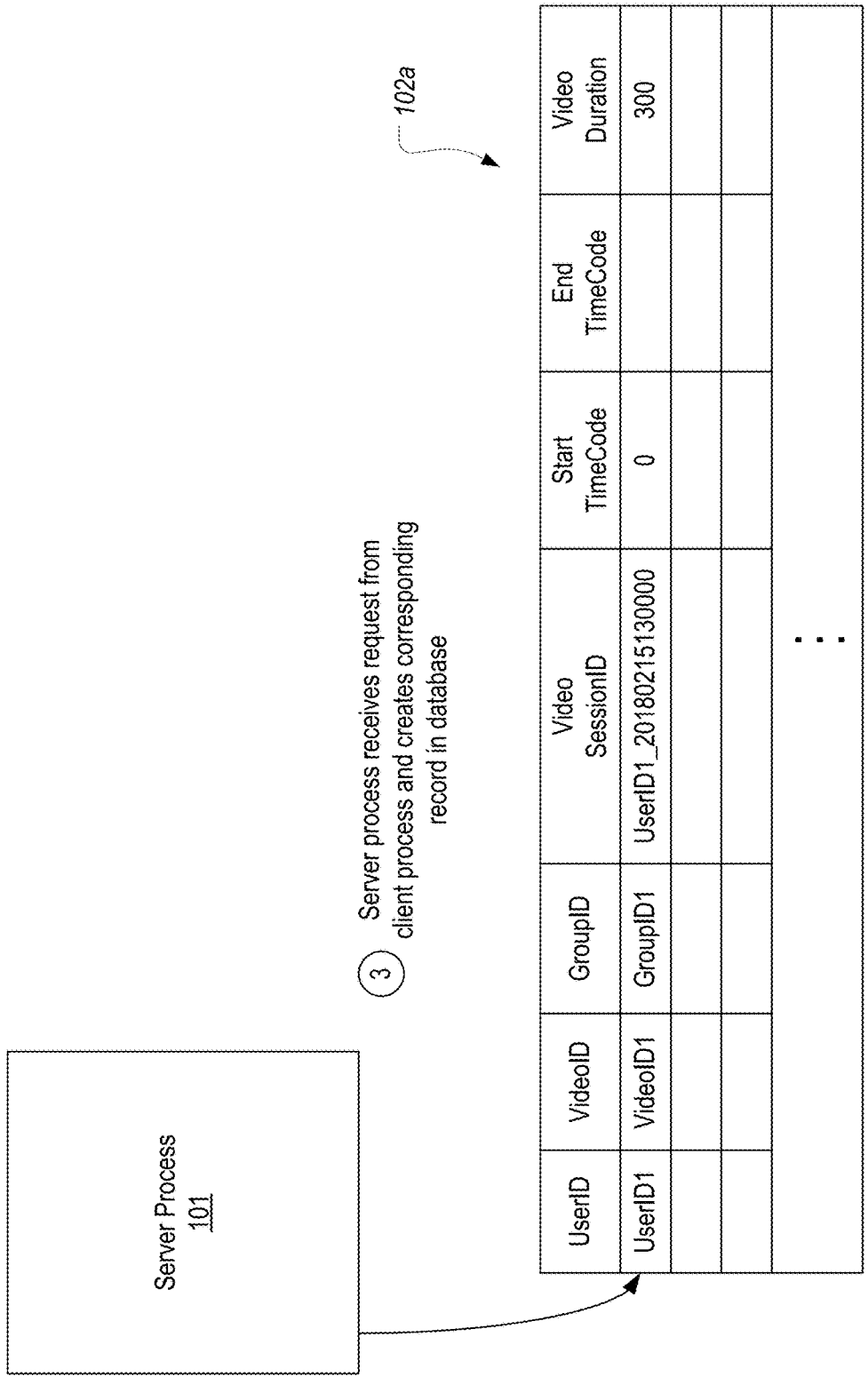

Upon receiving request 301, server process 101 extracts the values from request 301 and creates a record in data structure 102a using the extracted values as shown in step 3 of FIG. 3C. At this point, the record will not yet include a value for the EndTimeCode.

Figure 3D:
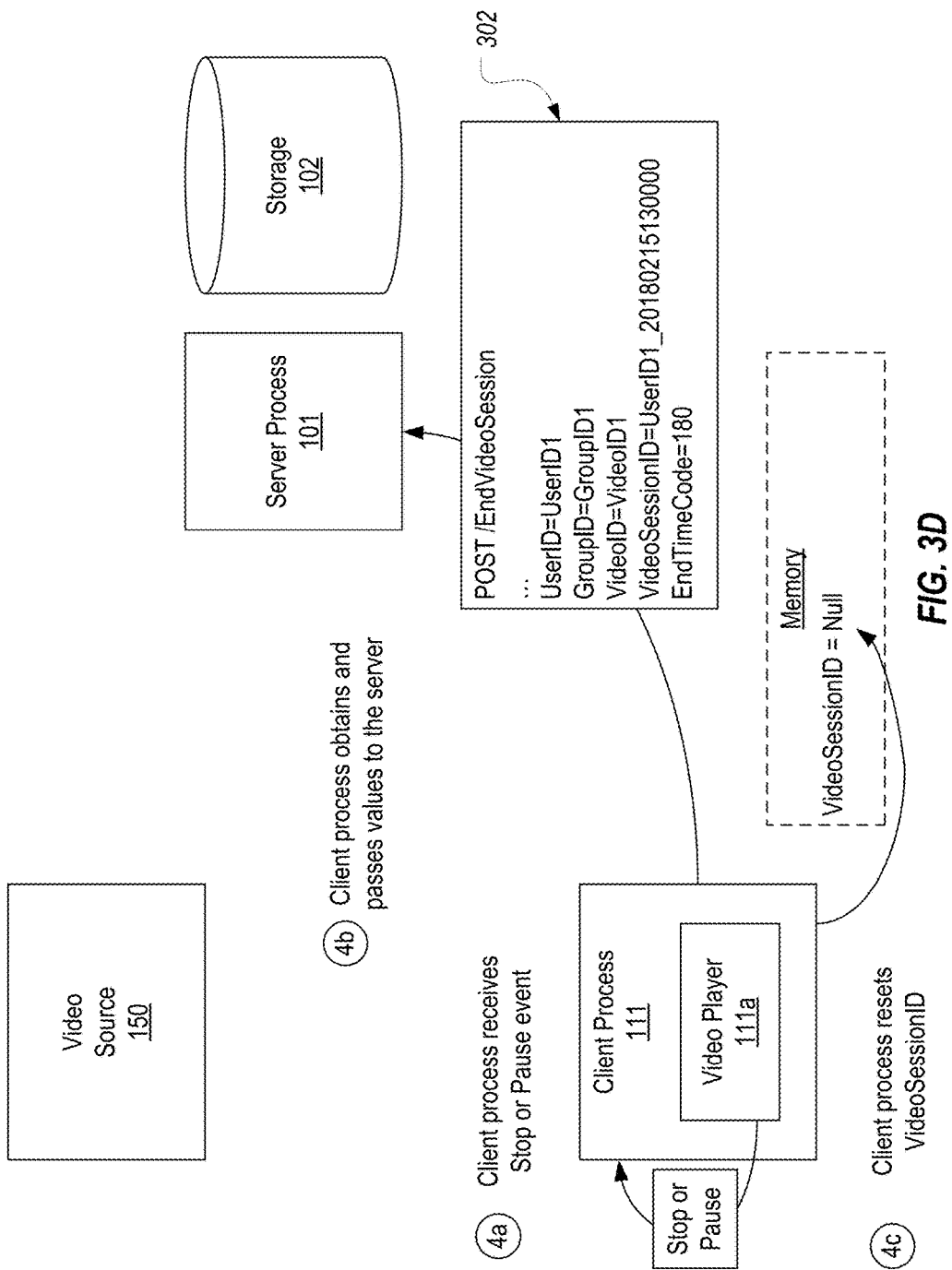

Turning to FIG. 3D, and as represented in step 4a, if/when the user pauses or stops playback of the video, or if playback completes, a Stop or Pause event will be raised and detected by client process 111. In response to the Stop or Pause event, client process 111 can obtain an EndTimeCode (e.g., using the currentTime property) representing the location within the video where playback has been paused/stopped (which is assumed to be 180 in this instance) and can also retrieve the values for UserID, VideoID, VideoSessionID, and possibly GroupID. Client process 111 can then send these values to server process 101 in EndVideoSession request 302 (e.g., via an HTTP Post request to an EndVideoSession endpoint of tracking API 101a).

Additionally, in step 4c, client process 111 can reset the value of VideoSessionID (e.g., by setting it back to null). By resetting VideoSessionID after each Stop or Pause event, client process 111 can employ VideoSessionID to detect when a Stop or Pause event may have been missed. In particular, as mentioned above, whenever client process 111 receives a Play or Resume event, it can first check whether VideoSessionID has been reset. If VideoSessionID has been reset, client process 111 will know that the previous video session start and end were successfully detected (i.e., the resetting of VideoSessionID indicates that the EndVideoSession request 302 was sent). In contrast, if VideoSessionID has not been reset (e.g., if it is still set to a legitimate VideoSessionID), client process 111 will know that the EndVideoSession request 302 was not sent for the previous session. When this occurs, client process 111 may still follow the same steps to send the StartVideoSession request 301 for the new session but may also log an error indicating that a Stop or Pause event had been missed. In some embodiments, this logging may include sending a notification to server process 101 to instruct server process 101 to delete or invalidate the corresponding record (i.e., the record with a VideoSessionID matching the current value of the VideoSessionID variable) since an EndTimeCode will never be provided for this record.

Figure 3E:
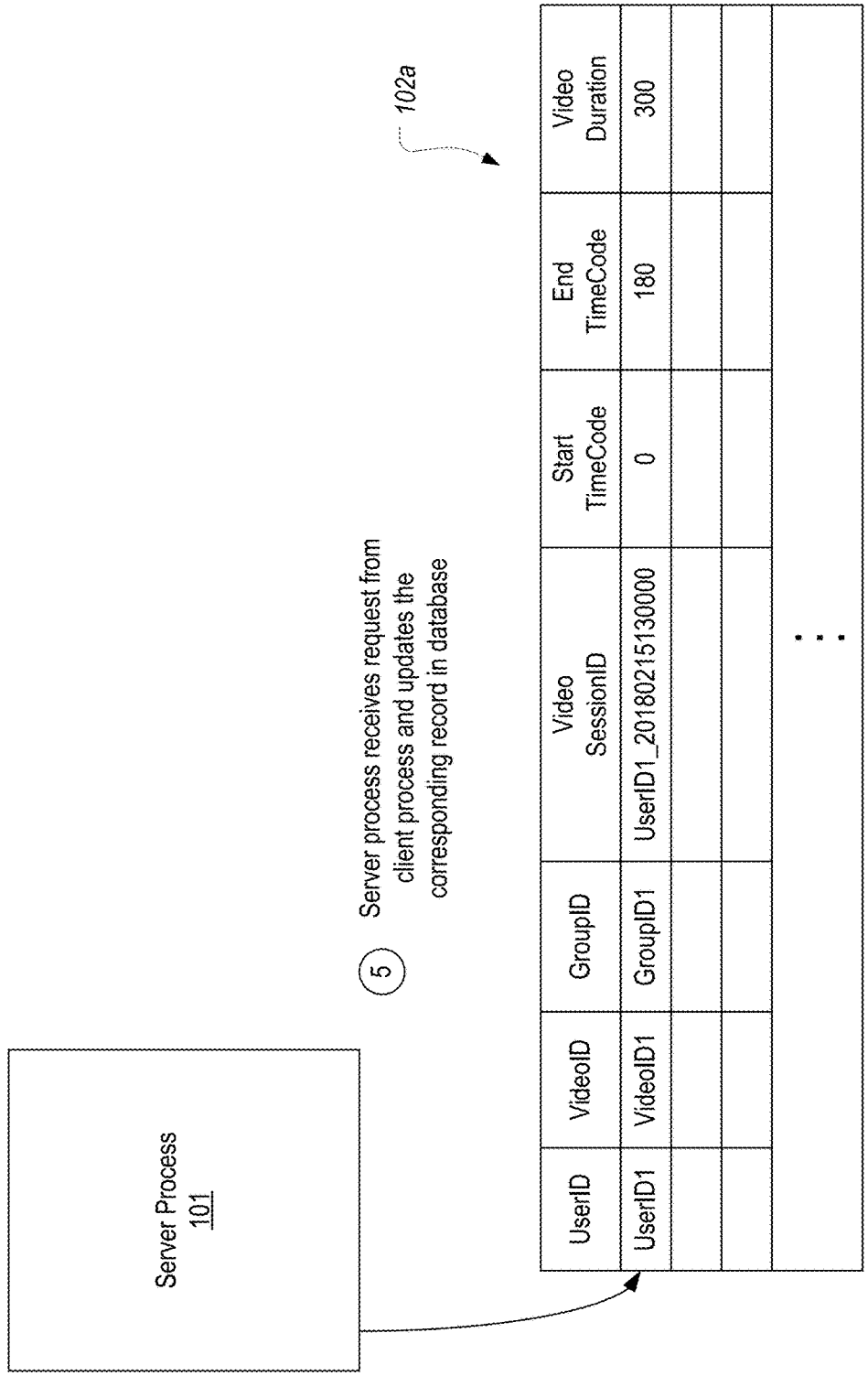

Next, in step 5 shown in FIG. 3E, server process 101 receives and processes EndVideoSession request 302 so that it can add the EndTimeCode to the corresponding record in data structure 102a. This can be accomplished by finding the record that has a VideoSessionID matching the VideoSessionID included in EndVideoSession request 302. In this example, the EndTimeCode will be set to 180 in the record having a VideoSessionID of UserID1_2018025130000.

This process can be repeated each time the user starts and stops playback of a video which will result in data structure 102a being populated with a number of records as shown in FIG. 3F. In this example and for ease of illustration, all of the depicted records define "sessions" where UserID1 watched VideoID1. However, data structure 102a could and typically would include records defining sessions where UserID1 watched other videos and when other users watched VideoID1 and other videos.

Figure 4A:
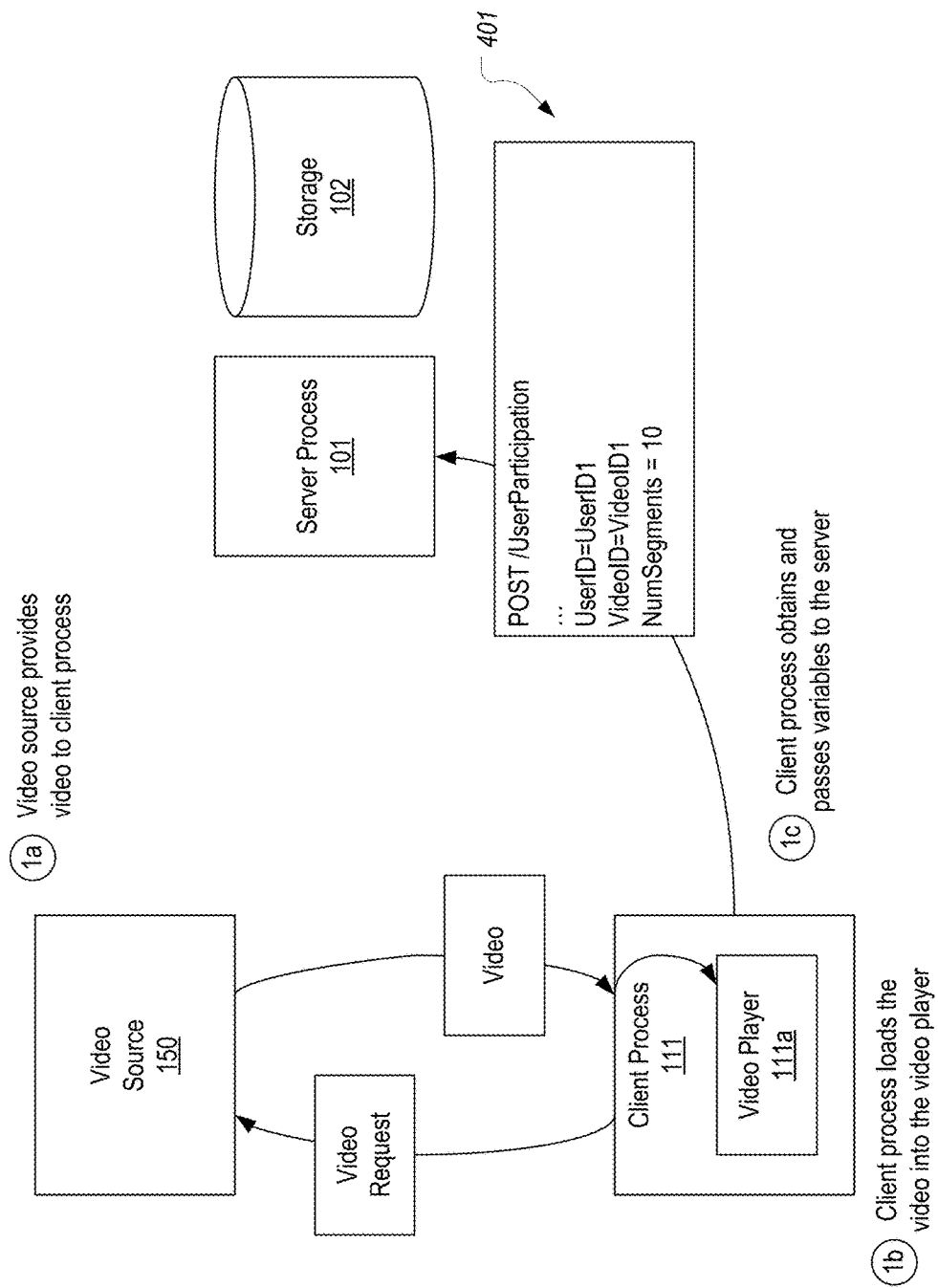
FIGS. 4A-4E depict a process by which the utilization of a video is visualized.

With data structure 102a populated with records (or at least one relevant record), the visualization process can be implemented. FIGS. 4A-4E illustrate steps of this visualization process which will be described in a scenario where UserID1 is again watching VideoID1. FIG. 4A illustrates steps 1a and 1b for retrieving and loading VideoID1 which are similar to the corresponding steps in FIG. 3A. As part of loading VideoID1, client process 111 can send a UserParticipation request 401 to server process 101 (e.g., via an HTTP Post request to a UserParticipation endpoint of visualizing API 101b). UserParticipation request 401 can include the UserID of the current user (UserID1), the VideoID of the current video (VideoID1) and a number of segments, NumSegments, to be visualized which is assumed to be 10 in this example. The value of NumSegments could be predefined in client process 111 or could be input by the user. The role of NumSegments is to give granular control over the number of segments that will be represented in a visualization. It is noted that the tracking process could also be performed with this visualization process (i.e., client process 111 could also send StartVideoSession requests 401 and EndVideoSession requests 402 when video utilization is being visualized).

Figure 4B:
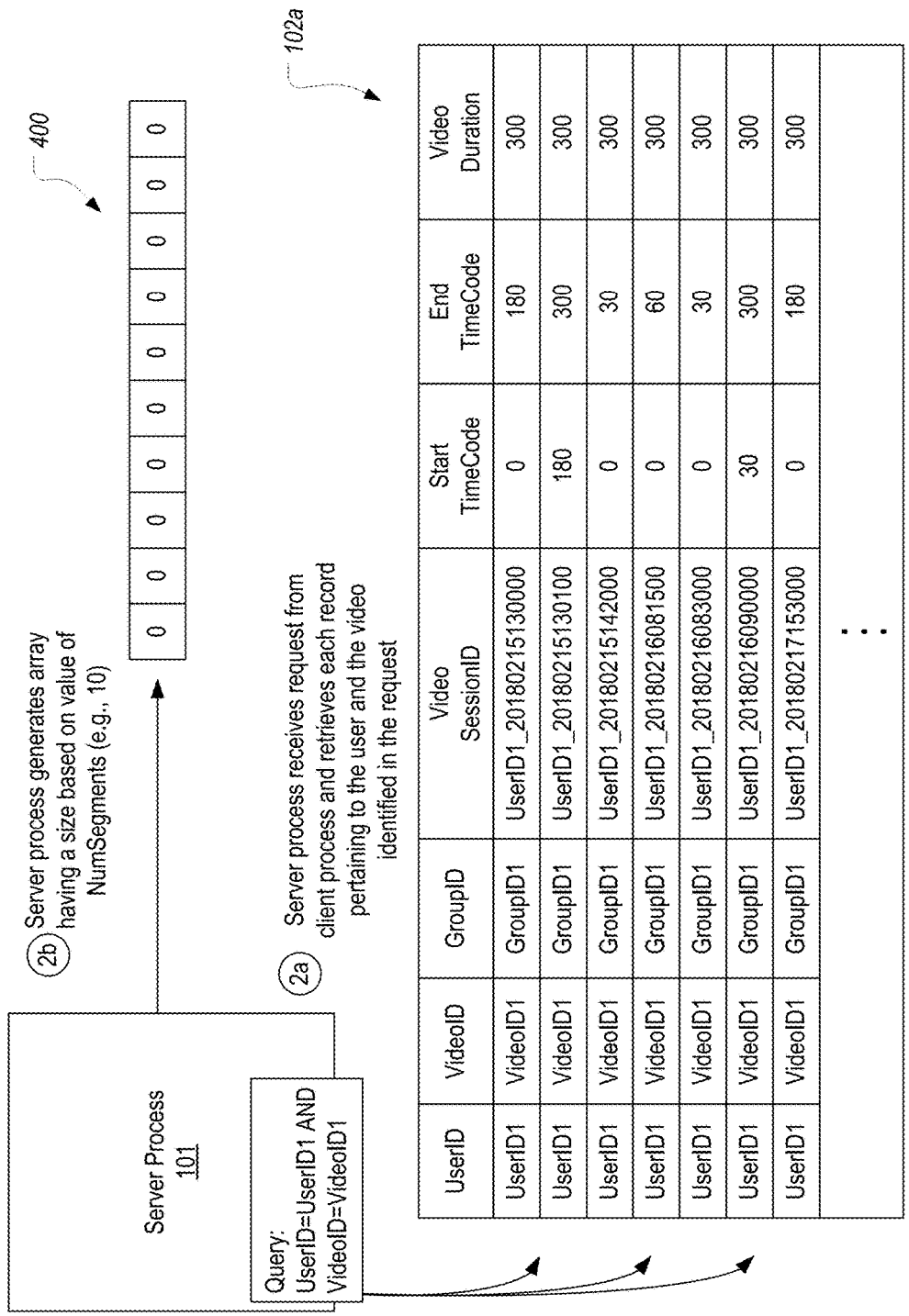

Turning now to FIG. 4B, when server process 101 receives UserParticipation request 401, it can extract the UserID and VideoID from the request and use them to generate a query to retrieve all matching records from data structure 102a in step 2a. In this example, a matching record would be any record having a UserID of UserID1 and a VideoID of VideoID1. For simplicity, the results of this query will be assumed to be the same as shown in FIG. 3F. Also, in step 2b, server process 101 can generate an array 400 having a size (10) matching the value of NumSegments in UserParticipation request 401. As an example, the elements in this array could be integers that are initialized to 0.

Figure 4C:
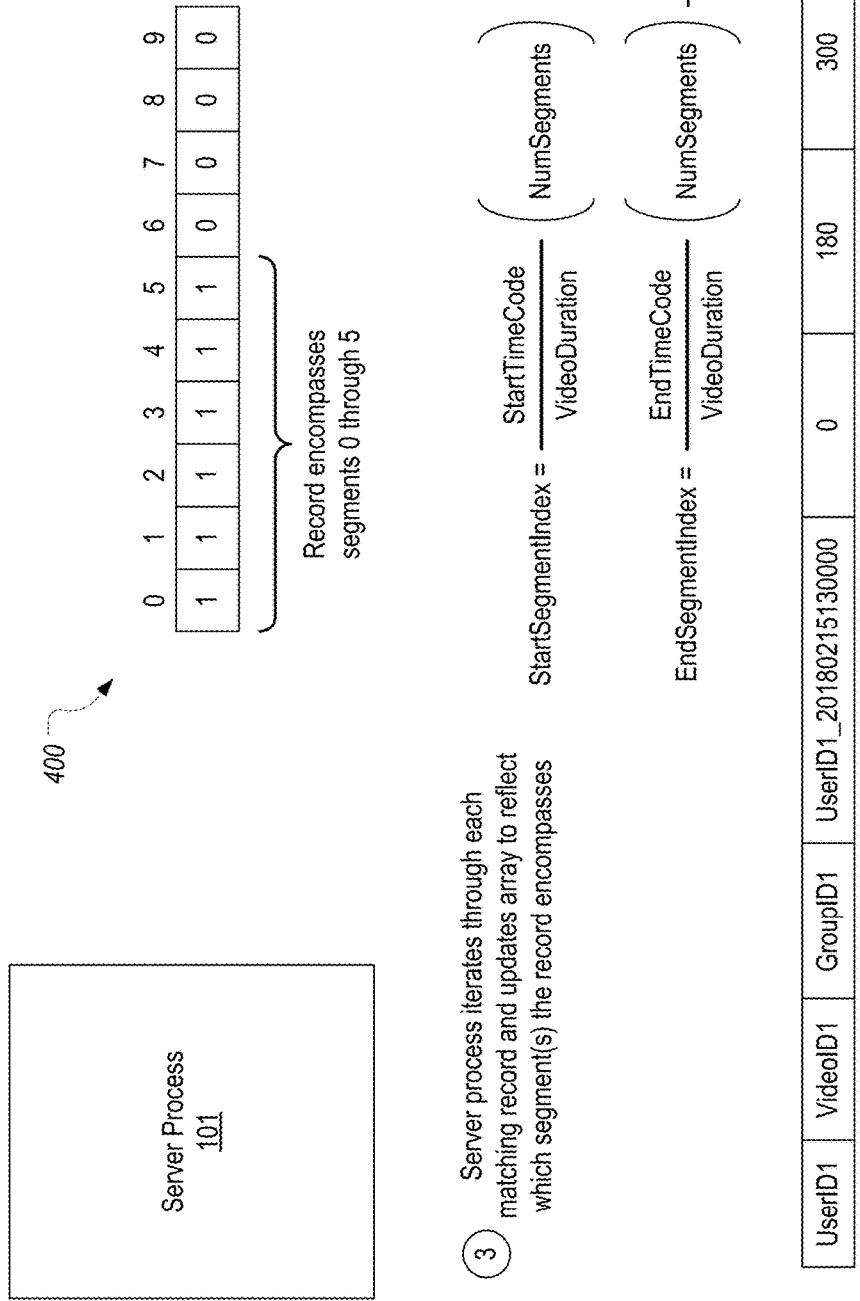
Figure 4D:
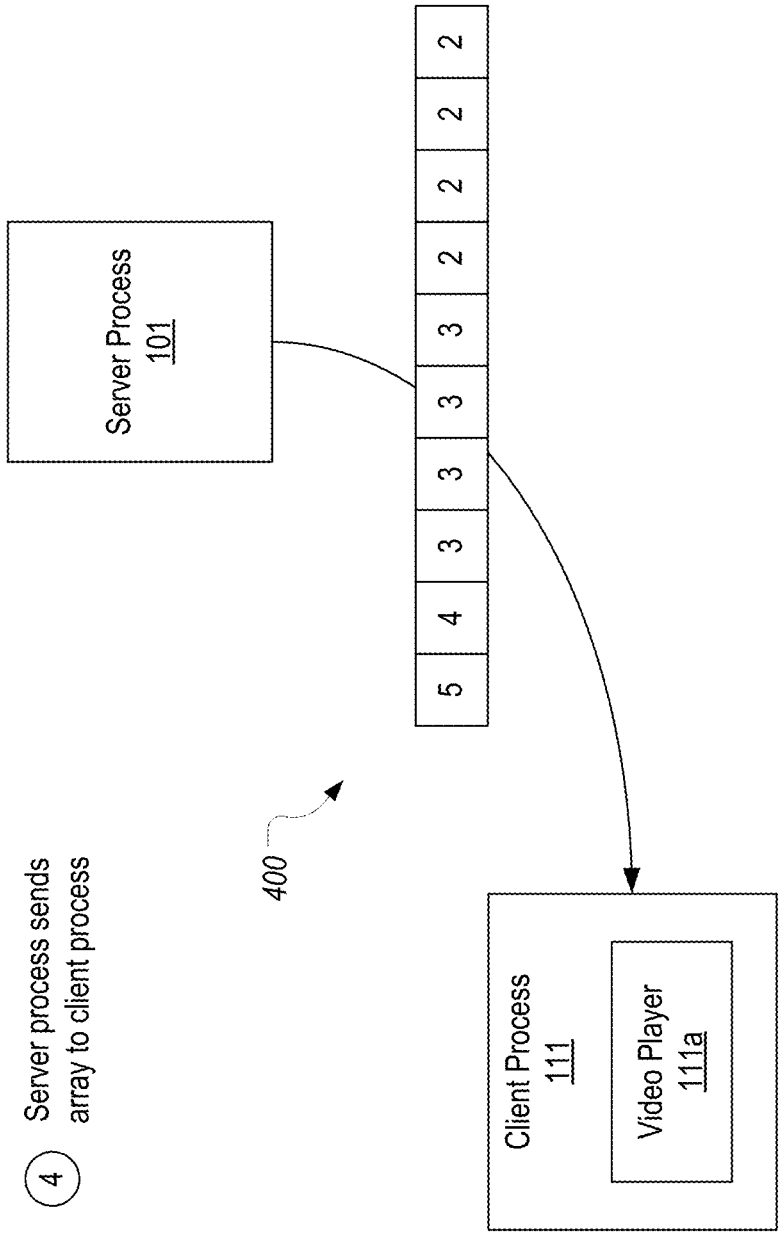

Next, in step 3 shown in FIG. 4C, server process 101 can employ the StartTimeCode, EndTimeCode and VideoDuration from each matching record to calculate which segments the record encompasses. As shown in FIG. 4C, this can be accomplished by dividing the StartTimeCode by the VideoDuration and multiplying by the NumSegments to calculate a StartSegmentIndex, and by dividing the EndTimeCode by the VideoDuration, multiplying by the NumSegments and subtracting 1 to calculate an EndSegmentIndex. Using an example where StartTimeCode is 0, EndTimeCode is 180, and VideoDuration is 300, the StartSegmentIndex will be 0 and the EndSegmentIndex will be 5 (representing that the user started watching the video at the beginning and stopped or paused after viewing segment 5). Server process 101 can then use the calculated values of StartSegmentIndex and EndSegmentIndex to increment values in array 400. In particular, server process 101 can increment the value of each element that is encompassed by the values of StartSegmentIndex and EndSegmentIndex. As shown for this example, the value of the elements in the $0^{th}$ through $5^{th}$ positions has been incremented by 1.

This process can be repeated for every matching record so that, after the process, each element in array 400 will define how many times the corresponding segment of the video was viewed. Using the records from FIGS. 3F and 4B, this process will yield an array 400 having the values shown in FIG. 4D which server process 101 sends to client process 111 as a response to UserParticipation request 401. As shown, array 400 defines that UserID1 viewed segment 0 (the first 30 seconds of the VideoID1) five times, segment 1 four times, segments 2-5 three times and segments 6-9 two times.

Figure 4E:
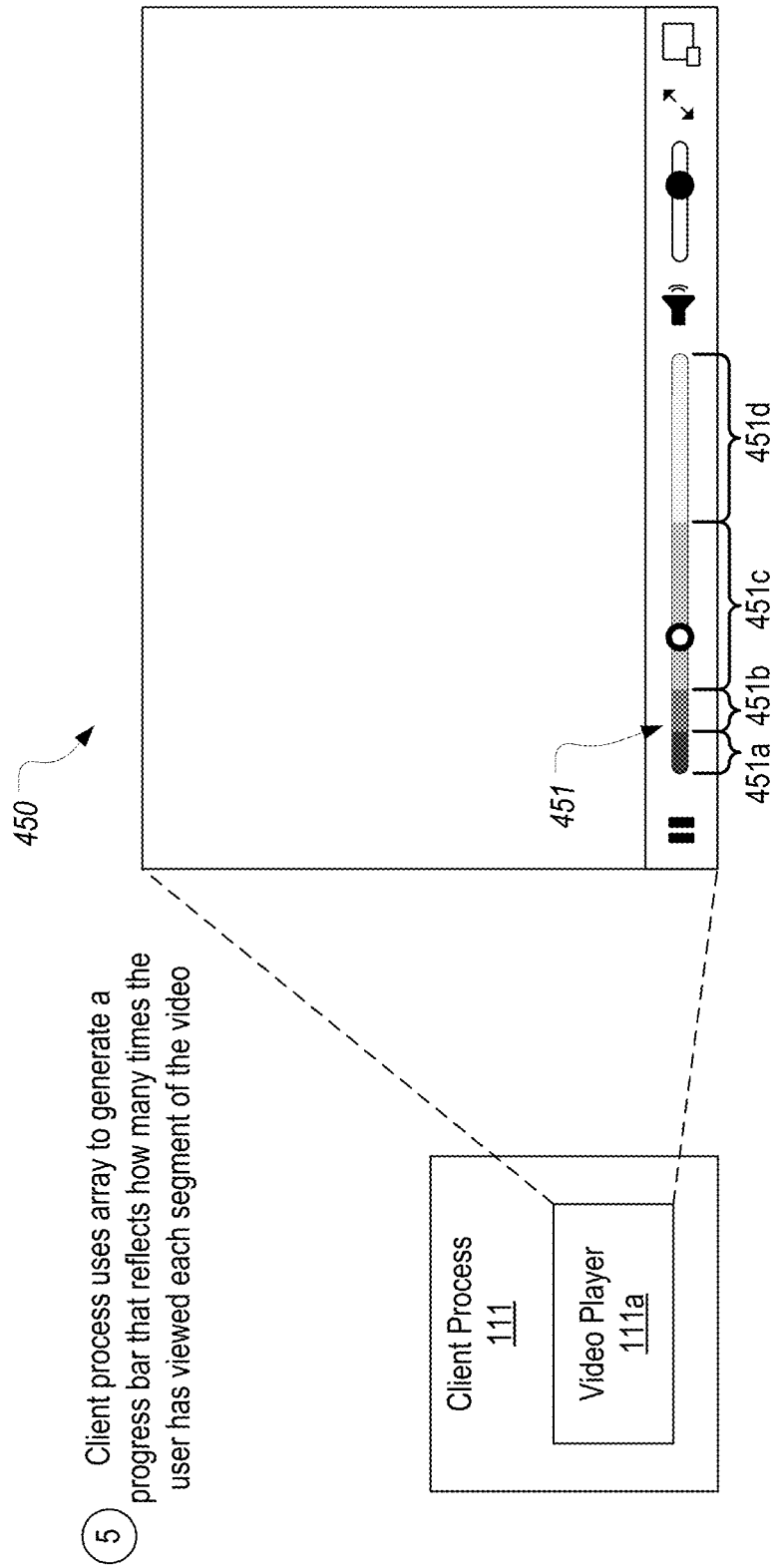

Finally, in step 5 shown in FIG. 4E, client process 111 can employ array 400 to generate a user interface element 451 that is configured to visually represent the user's utilization of the video. Client process 111 can display user interface element 451 while the corresponding video is loaded for playback and while playing. To accomplish this, client process 111 can identify or calculate the width of the existing progress bar in video player 111a and generate user interface element 451 with a matching width so that it can be overlayed on the existing progress bar. User interface element 451 can also be segmented based on the size of array 400. For example, client process 111 can divide user interface element 451 into 10 contiguous segments. One way to accomplish this segmenting of user interface element 451 is by employing a CSS linear gradient.

Additionally, client process 111 can determine a visual characteristic for each of the segments of user interface element 451 which will serve to represent the number of times the segment was viewed. As an example only, client process 111 could calculate a percent for each segment using the following formula:

Percent=Segment Value/Highest Value in Array

With this formula, segment 0 would have a percentage of 1.0 (5/5), segment 1 would have a percentage of 0.8 (4/5), segment 2 would have a percentage of 0.6 (3/5), etc. The percentage can then be used to calculate the opacity of the color of the corresponding segment such that the segments of user interface element 451 will vary in shade (assuming there are differences in the number of times each segment was viewed).

FIG. 4E provides an example where user interface element 451 includes a darkest portion 451a that encompasses segment 0, a second darkest portion 451b which encompasses segment 1, a third darkest portion 451c which encompasses segments 2-5, and a fourth darkest portion 451d which encompasses segments 6-9. The variations in the shadings of portions 451a-451d coincide with the variations in the values of array 400 and therefore readily identify the relative number of times that UserID1 has viewed the segments of VideoID1.

Rather than vary the opacity of a color, client process 111 could generate a heat map to represent how many times a segment of a video has been viewed. For example, client process 111 could cause portion 451a to be red, portion 451b to be yellow, portion 451c to be green, and portion 451d to be blue. The particular color assigned to a segment could again be based on the percentage calculated for that segment using the equation provided above where higher percentages map to colors towards the red end of the spectrum and lower percentages map to colors towards the violet end of the spectrum. Other techniques could also be employed to distinguish the appearance of one segment from another based on how many times the segments have been viewed. For example, different patterns or intensities could be employed.

Because user interface element 451 has the same width as the existing progress bar of video player 111a and because it is overlayed on the existing progress bar, the different segments of user interface element 451 will align with the segments of the video that they represent. Client process 111 can also be configured to dynamically update the width of user interface element 451 when the width of the existing progress bar is changed (e.g., when the user changes the browser window size, the size of video player 111a, or enters full screen mode). Therefore, a user can quickly identify how many times a current segment of the video has been viewed based on the appearance of the portion of user interface element 451 where the current position indicator is located. For example, in FIG. 4E, UserID1 could quickly identify that the current portion being played (which would be segment 3) was viewed fewer times than the first portions of VideoID1 but more times than the subsequent portion.

As mentioned above, in some embodiments, the ability to visualize group utilization of a video is provided. The process for visualizing group utilization is substantially the same as the process for visualizing a single user's utilization except that server process 101 calculates the values of array 400 in a different manner. Also, in step 1c client process 111 would send a GroupParticipation request containing a GroupID rather than a UserParticipation request 401 containing a UserID (e.g., via an HTTP Post request to a GroupParticipation endpoint of visualizing API 101b). In some embodiments, client process 111 may automatically determine the GroupID, while in other embodiments, the user may be allowed to specify a GroupID or other input that client process 111 can employ to obtain a particular GroupID. In some embodiments, a user may be limited to viewing group utilization for a group to which the user belongs. However, in other embodiments, a user may be allowed to view group utilization for a group to which the user does not belong. For example, client process 111 may allow a user to select from many possible groups. In some embodiments, a user may also belong to more than one group.

Figure 5:
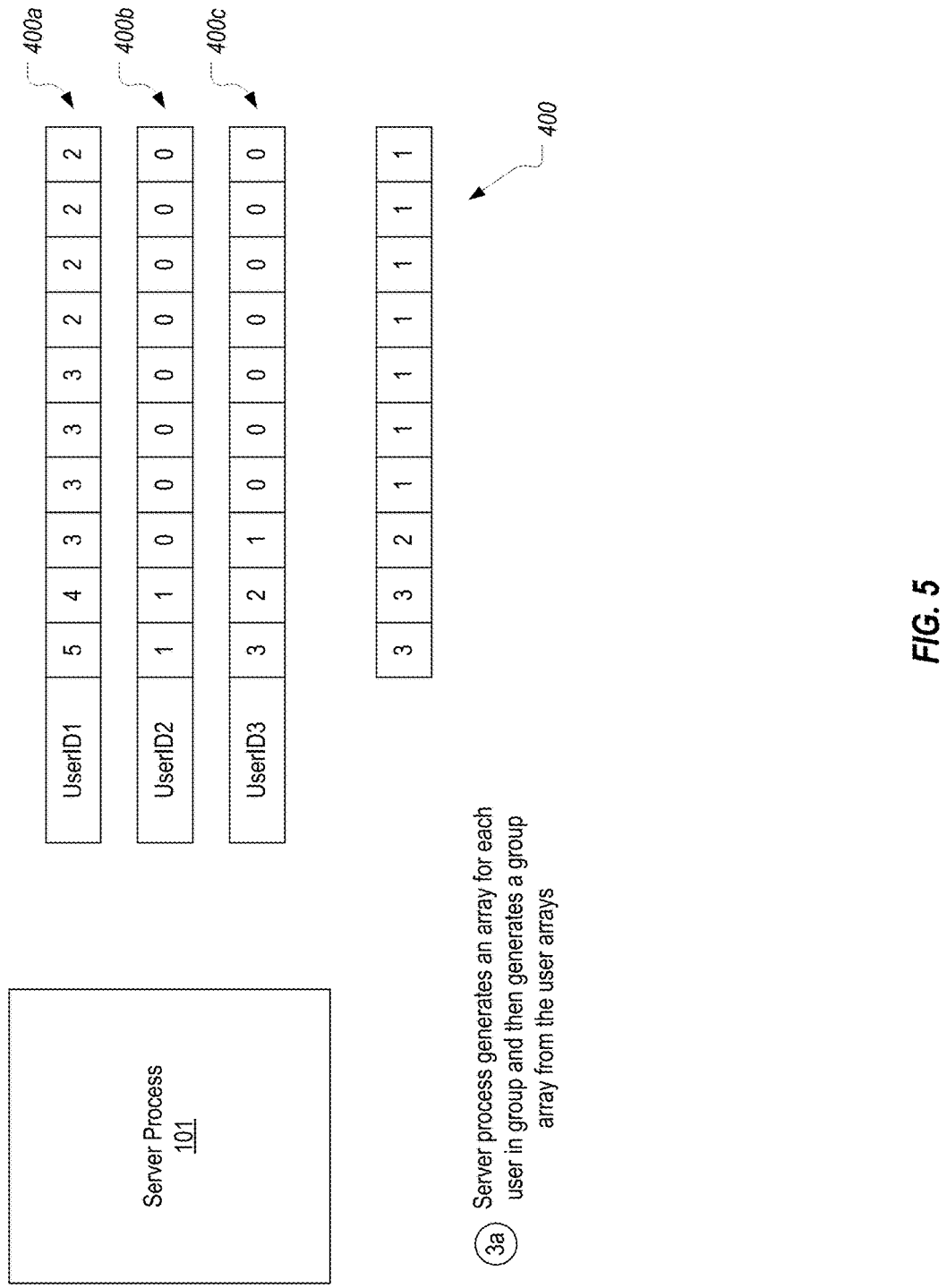
FIG. 5 illustrates an alternate embodiment where group utilization of the video is visualized.

FIG. 5 illustrates step 3a that would augment step 3 of FIG. 4C in group visualization scenarios. As mentioned above, to request group visualization for a particular video, client process 111 can submit a GroupParticipation request that includes a GroupID, a VideoID, and a value for NumSegments. Server process 101 can employ the GroupID in this request to query data structure 102a for all records having a matching GroupID (which is assumed to be GroupID1). It is noted that any matching record that does not yet include an EndTimeCode can be ignored. For purposes of this example, it will be assumed that the matching records pertain to either UserID1, UserID2 or UserID3 (i.e., the only users in GroupID1 that have started and stopped/paused the video are UserID1, UserID2 and UserID3).

Server process 101 can then generate an array for each UserID found in the matching records using the same process described above with reference to FIGS. 4B and 4C. In other words, an array 400a, 400b, 400c of size 10 can be generated for each of the users UserID1, UserID2, and UserID3 and the calculations of step 3 can be performed independently for each user's matching records. After this processing, arrays 400a, 400b, and 400c will define the number of times that the corresponding user viewed each segment of the video. Next, server process 101 can define array 400 and increment each element in the array based on the number of the user specific arrays that have a non-zero value in the corresponding element.

For example, in FIG. 5, element 0 has a value of 5, 1, and 3 in arrays 400a, 400b, and 400c respectively representing that UserID1 has viewed segment 0 five times, UserID2 has viewed segment 0 one time, and UserID3 has viewed segment 0 three times. Because each of arrays 400a, 400b, and 400c has a non-zero value in its $0^{th}$ element, the value of the $0^{th}$ element in array 400 is set to 3. In comparison, because only element 9 in array 400a has a non-zero value, the value of element 9 in array 400 is set to 1. Accordingly, array 400 in group visualization scenarios will define the number of users in a group that have viewed the corresponding segment.

Once server process 101 has generated array 400, it can return array 400 to client process 111 to allow client process to generate user interface element 451 in the manner described above. Using the values from FIG. 5, client process 111 could cause user interface element 451 to have three portions of different appearance: a first portion encompassing segments 0 and 1, a second portion encompassing segment 2, and a third portion encompassing segments 3-9. By displaying user interface element 451 in this scenario, the user could readily determine that more users in GroupID1 viewed segments 0 and 1 than the remaining segments of the video.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a client process and a server process, for tracking and visualizing video utilization, the method comprising:
    detecting, by the client process, a start of playback of a video on a user device;
    generating, by the client process, a session identifier for the start of playback;
    obtaining, by the client process, a start time code defining a time within the video when the start of playback occurred;
    sending, by the client process, a first request to the server process, the first request including a user identifier of a user of the user device, a video identifier of the video, the session identifier, and the start time code;
    creating, by the server process, a record in a data structure that includes the user identifier, the video identifier, the session identifier, and the start time code;
    detecting, by the client process, an end of playback of the video;
    obtaining, by the client process, an end time code defining a time within the video when the end of playback occurred;
    sending, by the client process, a second request to the server process, the second request including the session identifier and the end time code;
    accessing, by the server process, the record using the session identifier included in the second request;
    updating the record to include the end time code, wherein the data structure includes one or more other records that each includes the user identifier, the video identifier, a session identifier for a corresponding start of playback, a start time code defining a time within the video when the corresponding start of playback occurred, an end time code defining a time within the video when a corresponding end of playback occurred and the duration of the video;
    receiving, by the server process, a user participation request from the client process, the user participation request including the user identifier and the video identifier;
    retrieving, by the server process and from the data structure, each record that includes the user identifier and the video identifier;
    creating an array of elements corresponding to a number of segments of the video;
    for each retrieved record, calculating each segment of the video that is encompassed by the start time code and the end time code included in the record and, for each encompassed segment, incrementing a value of the corresponding element in the array such that the value of each element in the array represents a number of times that the user viewed the corresponding segment of the video; and
    sending the array to the client process.

2. The method of claim 1, wherein detecting the start of playback comprises detecting a play or resume event.

3. The method of claim 1, wherein one or both of the first request and the second request include a duration of the video, and wherein the server process stores the duration of the video in the record.

4. The method of claim 1, wherein generating the session identifier for the start of playback includes storing the session identifier, and wherein the client process access the stored session identifier to include the session identifier in the second request.

5. The method of claim 1, wherein the second request also includes the user identifier and the video identifier.

6. The method of claim 1, wherein detecting the end of playback comprises detecting a stop or pause event.

7. The method of claim 1, wherein the number of elements is defined in the user participation request.

8. The method of claim 1, further comprising:
    generating, by the client process, a user interface element that is segmented based on the number of segments;
    calculating, based on the value of a corresponding element in the array, an appearance value for each segment of the user interface element; and
    displaying the user interface element in conjunction with a progress bar of a video player in which the video is loaded, each segment of the user interface element being displayed in accordance with the corresponding appearance value.

9. The method of claim 8, wherein the appearance value is one of:
   a color;
   an opacity;
   a pattern; or
   an intensity.

10. The method of claim 8, wherein the user interface element is configured with a width that matches a width of the progress bar.

11. The method of claim 10, wherein the user interface element is displayed overtop the progress bar.

12. The method of claim 8, wherein calculating the appearance value for each segment of the user interface element comprises dividing the value of the corresponding element in the array by the highest value of an element in the array.

13. The method of claim 1, wherein the record and the one or more other records each include a group identifier, and wherein the data structure also includes additional records that each includes a user identifier of another user, the video identifier, the group identifier, a session identifier for a corresponding start of playback of the video, a start time code defining a time within the video when the corresponding start of playback occurred, an end time code defining a time within the video when a corresponding end of playback occurred and the duration of the video, wherein the method further comprises:
   receiving, by the server process, a group participation request from the client process, the group participation request including the group identifier and the video identifier;
   retrieving, by the server process and from the data structure, each record that includes the group identifier and the video identifier;
   creating, for each user identifier included in the retrieved records, an array of elements corresponding to a number of segments of the video;
   for each user identifier included in the retrieved records and for each retrieved record that includes the user identifier, calculating each segment of the video that is encompassed by the start time code and the end time code included in the record and, for each encompassed segment, incrementing a value of the corresponding element in the array creating for the user identifier such that the value of each element in the array represents a number of times that the corresponding user viewed the corresponding segment of the video;
   generating an additional array of elements corresponding to the number of segments of the video and setting a value of each element in the additional array based on values of corresponding elements in the arrays created for each user identifier; and
   sending the additional array to the client process.

14. The method of claim 13, further comprising:
   generating, by the client process, a user interface element that is segmented based on the number of segments;
   calculating, based on the value of a corresponding element in the additional array, an appearance value for each segment of the user interface element; and
   displaying the user interface element in conjunction with a progress bar of a video player in which the video is loaded, each segment of the user interface element being displayed in accordance with the corresponding appearance value.

15. One or more non-transitory computer storage media storing computer executable instructions which when executed in a client/server environment implement a method for tracking and visualizing video utilization, the method comprising:
   listening, by a client process, for events of a video player representing a start or end of playback of a video;
   for each event representing a start of playback of the video, sending, to the server process, a first request that includes a user identifier, a video identifier of the video, a session identifier representing the corresponding start of playback, and a start time code defining a time within the video when the corresponding start of playback occurred;
   for each event representing a stop of playback of the video, sending, to the server process, a second request that includes the user identifier, the video identifier, the session identifier representing the corresponding start of playback, and an end time code defining a time within the video when the corresponding end of playback occurred, wherein, in response to each pair of first and second requests, the server process creates a record that includes the user identifier, the video identifier, the session identifier, the start time code, the end time code, and a duration of the video;
   in response to a user participation request received from the client process, generating, by the server process, an array of elements, each element having a value representing a number of times that the user viewed a segment of the video, wherein the server process generates the array of elements using the start time code and the end time code of each record that includes a user identifier and a video identifier matching a user identifier and a video identifier specified in the user participation request; and
   in response to receiving the array from the server process, generating, by the client process, a user interface element having a segmented appearance based on the values of the elements in the array such that the user interface element visually represents the number of times that the user viewed each segment of the video.

16. The one or more non-transitory computer storage media of claim 15, wherein the client process is executed on multiple user devices on which multiple users view the video such that records are created that include a user identifier of the corresponding user, the video identifier, a group identifier of a group to which the multiple users belong, a session identifier representing the corresponding start of playback, a start time code defining a time within the video when the corresponding start of playback occurred, and an end time code defining a time within the video when the corresponding end of playback occurred, wherein the method further comprises:
   in response to a group participation request received from the client process, generating, by the server process, an array of elements, each element having a value representing a number of users in the group that have viewed a segment of the video, wherein the server process generates the array of elements using the start time code and the end time code of each record that includes a group identifier and a video identifier matching a group identifier and a video identifier specified in the group participation request; and
   in response to receiving the array from the server process, generating, by the client process, a user interface element having a segmented appearance based on the values of the elements in the array such that the user interface element visually represents the number of users in the group that have viewed each segment of the video.

17. A method, performed by a client process and a server process, for tracking and visualizing video utilization, the method comprising:

in response to detecting a start of playback of a video, sending, by the client process, a first request to the server process, the first request including a user identifier of a user of the user device, a video identifier of the video, and a start time code defining a time within the video when the start of the playback occurred;

creating, by the server process, a record in a data structure that includes the user identifier, the video identifier, and the start time code;

in response to detecting an end of the playback of the video, sending, by the client process, a second request to the server process, the second request including an end time code defining a time within the video when the end of the playback occurred;

updating the record to include the end time code;

receiving, by the server process, a user participation request from the client process, the user participation request including the user identifier and the video identifier;

creating, by the server process, an array of elements corresponding to a number of segments of the video, each element having a value representing a number of times that the user viewed a segment of the video, wherein the server process generates the array of elements using the start time code and the end time code of each record that includes the user identifier and the video identifier; and in response to receiving the array from the server process, generating, by the client process, a user interface element having a segmented appearance based on the values of the elements in the array such that the user interface element visually represents the number of times that the user viewed each segment of the video.

18. The method of claim 17, further comprising:

in response to a group participation request received from the client process, generating, by the server process, an array of elements, each element having a value representing a number of users in a group that have viewed a segment of the video, wherein the server process generates the array of elements using the start time code and the end time code of each record in the data structure that includes a group identifier and a video identifier matching a group identifier and a video identifier specified in the group participation request; and in response to receiving the array from the server process, generating, by the client process, a user interface element having a segmented appearance based on the values of the elements in the array such that the user interface element visually represents the number of users in the group that have viewed each segment of the video.

* * * * *